United States Patent
Peumans et al.

(10) Patent No.: US 10,871,447 B2
(45) Date of Patent: Dec. 22, 2020

(54) BLEACHING OF DYES IN LUMINESCENT DETECTION

(71) Applicant: IMEC VZW, Leuven (BE)

(72) Inventors: Peter Peumans, Herfelingen (BE); Liesbet Lagae, Leuven (BE); Willem Van Roy, Bierbeek (BE); Tim Stakenborg, Heverlee (BE); Pol Van Dorpe, Spalbeek (BE)

(73) Assignee: Imec VZW, Leuven (BE)

( * ) Notice: Subject to any disclaimer, the term of this patent is extended or adjusted under 35 U.S.C. 154(b) by 257 days.

(21) Appl. No.: 15/736,457

(22) PCT Filed: Jun. 30, 2016

(86) PCT No.: PCT/EP2016/065229
§ 371 (c)(1),
(2) Date: Dec. 14, 2017

(87) PCT Pub. No.: WO2017/001534
PCT Pub. Date: Jan. 5, 2017

(65) Prior Publication Data
US 2018/0172588 A1 Jun. 21, 2018

(30) Foreign Application Priority Data
Jun. 30, 2015 (EP) .................................. 15174671

(51) Int. Cl.
*G01N 21/64* (2006.01)
*G01N 21/27* (2006.01)

(52) U.S. Cl.
CPC ....... *G01N 21/6408* (2013.01); *G01N 21/648* (2013.01); *G01N 21/6428* (2013.01);
(Continued)

(58) Field of Classification Search
None
See application file for complete search history.

(56) References Cited

U.S. PATENT DOCUMENTS

| 5,827,663 | A | 10/1998 | Affleck et al. |
| 2008/0308746 | A1* | 12/2008 | Gleich ................. A61B 5/0073 |
| | | | 250/459.1 |

(Continued)

FOREIGN PATENT DOCUMENTS

| EP | 2 613 151 A1 | 7/2013 |
| WO | 2006/089342 A1 | 8/2006 |

(Continued)

OTHER PUBLICATIONS

PCT International Search Report and Written Opinion; PCT International Application No. PCT/EP2016/065229, dated Sep. 27, 2016, 15 pages.

(Continued)

*Primary Examiner* — Rebecca M Giere
(74) *Attorney, Agent, or Firm* — McDonnell Boehnen Hulbert & Berghoff LLP

(57) ABSTRACT

Sensor devices for quantifying luminescent targets are described herein. An example device comprises a light source for exciting the targets, thus generating luminescence signals and a detector for detecting these signals, resulting in a detected signal which comprises a desired signal originating from the targets and a background signal. It moreover comprises a bleaching device for bleaching of at least part of the sources generating the background signal and a processor configured to trigger the bleaching device to start bleaching, and to trigger the light source for exciting the remaining luminescent targets which are not bleached, and to trigger the detector for detecting the luminescence signal of the remaining luminescent targets, so as to generate a measurement signal representative for the quantification of the luminescent targets.

13 Claims, 4 Drawing Sheets

(52) U.S. Cl.
CPC ......... *G01N 21/274* (2013.01); *G01N 21/645* (2013.01); *G01N 2021/6413* (2013.01); *G01N 2021/6439* (2013.01)

(56) References Cited

U.S. PATENT DOCUMENTS

| | | | |
|---|---|---|---|
| 2010/0216652 A1* | 8/2010 | Eberwine | B82Y 15/00 |
| | | | 506/7 |
| 2012/0190012 A1 | 7/2012 | Butlin et al. | |
| 2012/0287244 A1* | 11/2012 | Bennett | G01N 21/6458 |
| | | | 348/46 |

FOREIGN PATENT DOCUMENTS

| | | |
|---|---|---|
| WO | 2007/101706 A1 | 9/2007 |
| WO | 2008/133945 A1 | 11/2008 |

OTHER PUBLICATIONS

Roberts, K.E. et al., "Selective Dequenching by Photobleaching Increases Fluorescence Probe Visibility", Journal of Fluorescence, vol. 13, No. 6, Nov. 2003, pp. 513-517.

Connally, Russell et al., "High Resolution Detection of Fluorescently Labeled Microorganisms in Environmental Samples Using Time-Resolved Fluorescence Microscopy", FEMS Microbiology Ecology, vol. 41, 2002, pp. 239-245.

Hirschfeld, Tomas, "Fluorescence Background Discrimination by Prebleaching", The Journal of Histochemistry and Cytochemistry, vol. 27, No. 1, 1979, pp. 96-101.

\* cited by examiner

BLEACHING OF DYES IN LUMINESCENT DETECTION

CROSS-REFERENCE TO RELATED APPLICATION

The present application is a national stage entry of PCT/EP2016/065229 filed Jun. 30, 2016, which claims priority to European Patent Application No. 15174671.6 filed Jun. 30, 2015, the contents of which are hereby incorporated by reference.

FIELD OF THE DISCLOSURE

The present disclosure relates to the field of sensors, more particularly for instance biosensors. More specifically it relates to sensors making use of luminescence for quantifying a component in a solution.

BACKGROUND

Affinity based bio-sensors use an affinity probe which specifically binds to a target molecule. The target molecule is the molecule which comprises or consists of the analyte molecule that needs to be quantified. In affinity based bio-sensors the binding event is detected by a transduction scheme. This can be a direct detection of the binding event (e.g. in a label free sensor), or it may be an indirect chain of interactions that can be detected. In the last case a second probe with a label allows to obtain e.g. an optical or electrochemical signal representative for the amount of analyte being present. The label may for example be a fluorophore or an enzyme that catalyzes still another reaction that for example provides an optical or electrochemical signal.

In affinity based bio-sensors with fluorescence signal transduction, a bulk sample is sent over a surface, and the target molecule (analyte) is bound by an affinity probe on the surface. The presence of target molecules on the surface is thereby correlated with the presence of labels on the surface. These labels may for example be fluorescent. In such bio-sensors the fluorescent light is captured and its intensity is a measure for the amount of analyte molecules present in the original bulk sample. The affinity probe may for example be an antibody, an antigen, an aptamer, complementary DNA or a molecularly imprinted surface. In the affinity based fluorescent bio-sensor with evanescent excitation fluorescence, total internal reflection may be used to create an evanescent field very close to the sensor surface, to excite only those fluorophores which are present very close to the surface, and of a large fraction of which can be expected that they are bound to an affinity probe on the surface.

Despite the already existing affinity based sensors there is still room for building improved affinity based sensors.

SUMMARY

It is an object of embodiments of the present disclosure to provide optical detection systems with a good, e.g. an improved, signal to noise ratio. It is an objective of embodiments of the present disclosure to be able to separate the desired signal from background signal(s).

The above objective is accomplished by a method and device according to the present disclosure.

In a first aspect, the present disclosure provides a sensor device for determining presence of luminescent targets. The sensor device comprises:

a light source for exciting the luminescent targets, thus generating luminescence signals, a detector for detecting the luminescence signals of the luminescent targets, resulting in a detected signal which comprises a desired signal originating from the luminescent targets and a background signal, a bleaching device for bleaching at least part of the sources generating the background signal, a processor configured to trigger the bleaching device to start bleaching and stop bleaching; and to trigger the light source, after bleaching, for exciting the remaining luminescent targets, wherein the remaining luminescent targets are those targets which are not bleached; and to trigger the detector for detecting the luminescence signal of the remaining luminescent targets, so as to generate a measurement signal representative for the quantification of the luminescent targets.

In example embodiments of the present disclosure, the background contributing sources are bleached during the bleaching step. In example embodiments of the present disclosure, the luminescent sources of background tend to build up faster in the sensor device that the target sources, hence at the moment of bleaching more background sources than target sources are bleached. The bleached luminescent sources of background do not generate a background signal anymore. This results in a permanently decreased background signal after the bleaching. Since the bleaching step is applied before saturation of the desired signal, buildup of the desired signal continues after the bleaching step with the remaining luminescent (non-bleached) targets. After the bleaching an excitation signal is generated which triggers the luminescent targets, which were not subject to the bleaching and which are bound in the sensor device after applying the bleaching, to generate a luminescent signal. In example embodiments of the present disclosure, no selective bleaching is required. Any luminescent sources may be bleached during the bleaching step.

In embodiments of the present disclosure the bleaching device is adapted for selective bleaching, wherein the sources generating the background signal are bleached more than the luminescent targets.

In example embodiments of the present disclosure, the desired signal is decreased less than the background signal.

In embodiments of the present disclosure, the processor is configured to obtain the luminescent intensity using the detector during bleaching and to stop the bleaching device from bleaching when the obtained luminescent intensity has dropped below an adjustable threshold.

In example embodiments of the present disclosure, bleaching is stopped as soon as the measurement signal, including as a substantial part the background signal, is decreased an adjustable amount. The faster the bleaching can be stopped the higher the number of remaining luminescent targets useful for the desired signal.

In embodiments of the present disclosure the bleaching device is a light source adapted for generating a high intensity pulse causing bleaching of at least part of the sources generating the background signal.

In example embodiments of the present disclosure, the bleaching can be done using a light source, which is easy to implement. In example embodiments of the present disclosure, this light source can be the same light source as the light source for generating the excitation step. Therefore a light source may be used of which the intensity can vary.

In embodiments of the present disclosure the luminescent targets are present in a fluid and wherein the bleaching device is adapted for applying a chemical plug which causes bleaching of at least part of the sources generating the background signal.

In example embodiments of the present disclosure, bleaching can be applied by applying a chemical plug. This can for example be a liquid plug which modifies the pH of the fluid in which the luminescent targets reside, thereby causing bleaching of at least part of the sources generating the background signal. In example embodiments of the present disclosure, the modifications in the device required for applying a chemical plug are limited to providing extra microfluidics (e.g. an extra reservoir and valve). This as opposed to for example photobleaching where an intense light source is required.

A sensor device according to embodiments of the present disclosure may comprise:
- a surface or a three dimensional volume for binding the luminescent targets,
- an evanescent field generating structure, wherein the light source is coupled to the evanescent field generating structure and wherein the evanescent field generating structure is adapted for generating an evanescent field at the surface or in the three dimensional volume.

In example embodiments of the present disclosure, the luminescent targets which should be quantified, are bound to the surface of the device and that substantially only the surface of the device is illuminated by the light source. By substantially only illuminating the surface, the background signal can be reduced, thus increasing the signal to noise ratio. In example embodiments of the present disclosure, it is not required to remove the bleached luminescent targets from the device to make place for new luminescent targets. This is not required as the bleaching is done early in the binding process, before the desired signal is saturated, thereby leaving enough space for new luminescent targets to enter the device (e.g. to bind with the affinity probes surface). Hereby the difference in slope between the desired signal and the background signal is exploited. In example embodiments of the present disclosure, a moment in time can be selected for bleaching, at which the background signal is almost saturated and at which the desired signal is not yet saturated.

In a second aspect, the present disclosure provides a diagnostic device comprising a sensor device according to embodiments of the first aspect of the present disclosure, for sensing an analyte and generating a sensing signal, and an output unit for providing an output of the sensor device on which a diagnose can be based. The output unit may be adapted for outputting a signal representative for presence/absence or concentration of the analyte.

In a third aspect, the present disclosure provides a method for quantifying luminescent targets. The method comprises:
- injecting, at a first time, a sample comprising the luminescent targets or injecting blocking material,
  —bleaching at least part of the sources generating a background signal,
- injecting a sample comprising the luminescent targets if this was not done when injecting the first time,
- measuring the luminescence signal exciting the luminescent targets which are not bleached, thus generating a luminescence signal, detecting the luminescence signal of the remaining luminescent targets which are not bleached, wherein the measured luminescence signal comprises the desired signal emanating from the luminescent targets and a background signal, so as to generate a measurement signal representative for the quantification of the luminescent targets.

A method according to embodiments of the present disclosure may comprise: determining a moment in time when bleaching should start, and starting bleaching at that moment.

In example embodiments of the present disclosure, the moment in time the bleaching starts may be obtained by calibration and/or by real-time measurements. The number of luminescent targets which will be bleached during the bleaching step may be minimized by starting the bleaching as soon as the background signal reaches a degree of saturation determined by a threshold, but before the desired signal reaches saturation.

A method according to embodiments of the present disclosure may comprise a measure and compare step after injecting the sample or blocking material, the measure and compare step comprising exciting the sample or the blocking material, thus generating a luminescence signal, detecting the luminescence signal coming from the sample or blocking material, analyzing the measured luminescence signal so as to obtain a moment to start bleaching and repeating the detecting and analyzing until the moment to start bleaching is determined.

A method according to embodiments of the present disclosure may comprise: determining the duration of the bleaching step, and stopping bleaching after the determined duration has expired.

In example embodiments of the present disclosure, the duration of the bleaching step may be limited to just what is required to bleach the background luminescence, thus limiting the bleaching of target luminophores as much as possible.

A method according to embodiments of the present disclosure may comprise: a feedback loop during the bleaching step. The feedback loop comprises:
- detecting a luminescence signal during bleaching,
- analyzing the detected signal and comparing it with a luminescence signal obtained before bleaching started; and stopping the bleaching when the detected signal drops below a predetermined fraction of the luminescence signal obtained before bleaching started, or continuing bleaching and repeating the detection and analyzing steps if the detected signal has not dropped below the predetermined fraction of the luminescence signal obtained before bleaching started.

In example embodiments of the present disclosure, the moment in time the bleaching stops is controlled by comparing the detected signal with an adjustable threshold. This allows minimization of the duration of bleaching, and hence to minimize the number of luminescent targets which will be bleached during the bleaching step, by stopping the bleaching as soon as the detected signal reaches a level below the threshold level.

Particular aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

BRIEF DESCRIPTION OF THE DRAWINGS FIGURES

Figure 1:
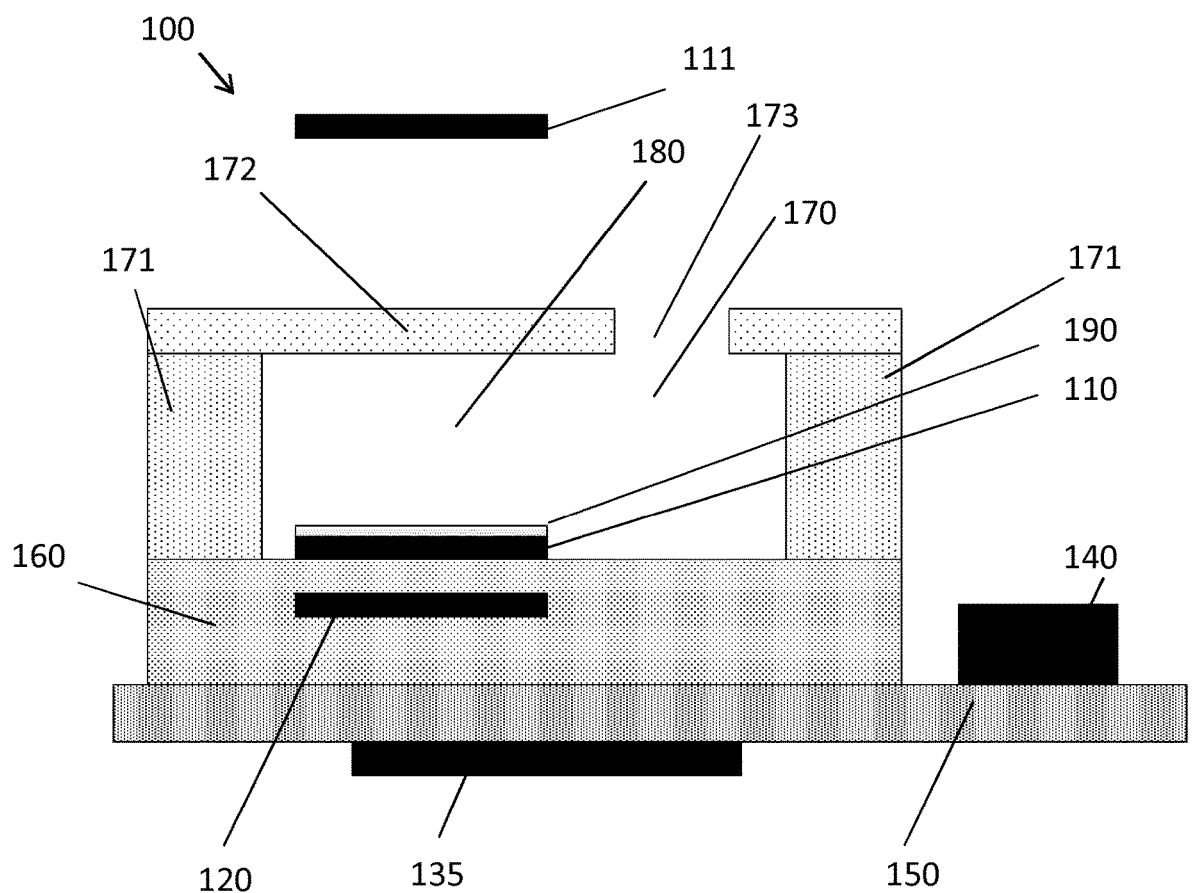
FIG. 1 is a schematic drawing of a device in accordance with embodiments of the present disclosure.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

As used herein and unless provided otherwise, the term "analyte" or "target" refers to the substance to be measured, the substance having or not having a biological origin. By the expression "substance having a biological origin", we intend to mean a substance that is present or produced in a living organism. Particularly, the substance may be a biomolecule. For instance, the analyte may be a protein or an antigen. The analyte may or may not be labeled for detection. In the context of the present disclosure, the terms target and analyte are considered to be synonyms.

By the term "biomolecule" is meant any molecule that is present in living organisms, including large macromolecules such as proteins, polysaccharides, lipids, and nucleic acids, as well as small molecules, such as primary metabolites, secondary metabolites, and natural products. The term "biomolecule" also encompasses molecules with similar properties and/or structure and/or composition, but that have been manufactured artificially rather than in a living organism.

Where in embodiments of the present disclosure reference is made to "luminescence of a target", reference is made to emission of light by the target, not resulting from thermal emission. Typically, in the context of the present disclosure, luminescence will be photoluminescence, generated by absorption of photons; such as fluorescence or phosphorescence. The present disclosure, however, is not limited to this type of luminescence, and can also be applied in case of, for instance, bioluminescence or chemiluminescence (emission as a result of a (bio)chemical reaction by an organism) or electroluminescence (a result of an electric current passed through the target).

Where in embodiments of the present disclosure reference is made to the "background signal", reference is made to any signal which is disturbing the measurement of the desired signal. This may comprise background signals from luminescent sources which do not form part of the target under study. This may comprise luminescence which is scattered by scattering centers in the device. This may comprise any other noise source which is present in the device.

Where in embodiments of the present disclosure reference is made to "quantifying luminescent targets", reference is made to either determining the presence of luminescent targets, or determining the amount of luminescent targets, or determining the concentration of luminescent targets.

In a first aspect, the present disclosure provides a device 100 for quantifying targets (analyte) which may be present in a fluid sample, e.g. in a biological fluid such as a blood sample, a urine sample, a drop of saliva, sperm. One embodiment of such device 100 is schematically illustrated in FIG. 1. Devices according to embodiments of the present disclosure may comprise a microfluidic channel 170 for guiding the sample towards a cavity 180 in or on a substrate 160, for instance a semiconductor substrate such as e.g. a silicon substrate or a transparent substrate such as e.g. a glass substrate. The microfluidic channel 170 and/or the cavity 180 may have sidewalls 171 and top 172, inlet(s) and/or outlet(s) 173. These sidewalls 171, 172 and/or inlets/outlets 173 may be transparent or opaque. The cavity 180 and the microfluidic channel 170 may be the same. The cavity 180 may comprise a surface 190 on which affinity probes may be present for capturing the target molecule. In embodiments of the present disclosure the analyte may be luminescent (e.g. fluorescent) itself or it may be labeled with a luminescent label.

In embodiments of the present disclosure the sample may be injected in the device as a one-time event (e.g. filling a reservoir) or the injection may be a continuous event (e.g. triggered by starting a flow) that continues during the subsequent steps when quantifying the targets.

In embodiments of the present disclosure the luminescent targets may be illuminated through (regular) free space illumination or through evanescent illumination. In free space illumination light source 111 is illuminating at least the surface 190 with the affinity probes. The light source 111 may be located at the top (the top wall 172 and any other layer between the light source 111 and the cavity 180 should be transparent) or bottom (the substrate 160 and any other layer between the light source 111 and the cavity 180 should be transparent) of the sensor device 100. The light source 111 may be, amongst others, a laser, a laser diode, a VCSEL, a LED, a lamp, a Tungsten lamp, a Halogen lamp, a Mercury lamp, a Xenon lamp, a Metal Halide lamp. In embodiments of the present disclosure the light coming from the light source 111 may be projected or focused by lenses or mirrors or a microscope or optical fibers on the surface 190. (In this case no evanescent field generating structure 110 is present).

In case of evanescent illumination, devices according to embodiments of the present disclosure comprise an evanescent field generating structure 110 for generating an evanescent field at the surface 190.

The evanescent field generating structure 110 may be integrated in or on the substrate 160 or it may be separate from the substrate 160 (e.g. against the microfluidic channel top wall 172 or sidewalls 171). In embodiments of the present disclosure the light of the light source 111 may be guided towards the cavity 180 using a connecting structure such as an optical waveguide (not illustrated). The light may be coupled to the evanescent field generating structure 110 or to the connecting structure using any suitable optical device, such as for instance a grating coupler or a butt coupler.

In embodiments of the present disclosure the light source 111 may be integrated in the substrate 160. In case of close integration with the rest of the device 100, the light source 111 may be, amongst others, a laser, a laser diode, a VCSEL, a LED. These light sources may be applied in the case of evanescent excitation.

In case the light source 111 is not necessarily closely integrated with the rest of the device 100 it may also be a laser, a lamp, a Tungsten lamp, a Halogen lamp, a Mercury lamp, a Xenon lamp, a Metal Halide lamp. This type of light source can also be applied in the case of evanescent excitation.

Devices 100 according to embodiments of the present disclosure moreover comprise a detector 120 which can detect the luminescence of the luminescent target after the target has been excited with the evanescent field generating structure 110 or light source 111. The measured signal is composed of a desired signal which originates from the luminescent targets and a background signal emanating from other luminescent sources present in the system. The detector 120 may be a multi-pixel detector for imaging the surface 190 of the device 100. The detector 120 may be, amongst others, an imager, a line detector, a single detector, a CMOS detector, a CCD detector, a (n array of) photodiode(s), an (array of) avalanche photodiode(s), a (n array of) photomultiplier tube(s) PMT(s). The detector 120 may be located external to the cavity 180 (not integrated in/in physical contact with either substrate 160 or top 172). In that case at least one top or bottom wall (e.g. walls from the microfluidic channel 171, 172, substrate 160, any other layer) should be transparent such that the luminescence signals from the luminescent targets can exit from the cavity through this wall. In case the detector is located external to the cavity additional lenses, as used in classical optics, may be applied for guiding the luminescence signals towards the detector.

In embodiments of the present disclosure the detector 120 may be integrated with the cavity 180. It may be present at the top or at the bottom of the cavity. The bottom side is the side where the target molecules bind to the affinity probes, the top side is the opposite side thereof. The detector 120 may be present on the inside or the outside of the cavity. When on the outside a transparent wall of the cavity is required.

In embodiments of the present disclosure luminescence from the luminescent targets may be collected by a waveguide connected to the detector 120. This waveguide may be the same as the excitation waveguide, or it may be a different waveguide. The luminescent light may be coupled from the waveguide into the detector 120 the same way as the light coming from the light source is coupled into the waveguide (e.g. through a grating coupler, butt coupling etc.). This may be the same coupler as the input coupler, if it has enough bandwidth and if incoming and outgoing light is handled appropriately, or it may be a different coupler. In embodiments of the present disclosure the input coupler and the output coupler are different. In embodiments of the present disclosure diffraction and/or reflection optics may be present between the waveguide and the detector. This may for example be a lens to project the output couplers onto the detector. Filters may be present, in, on or before the detector, for attenuating light which is outside the frequency range of the light generated by the luminescent targets. The detector 120 may be a CMOS imager.

Devices 100 according to embodiments of the present disclosure moreover comprise a bleaching device 135 for bleaching (e.g., destroying, making non-luminescent) of at least part of the sources generating the background signal.

Devices 100 according to embodiments of the present disclosure may moreover comprise a processor 140 configured to trigger the bleaching device 135 to start bleaching. Thereby the difference in time evolution between the intensity of the desired signal and the intensity of the background signal is exploited, the latter having a faster time evolution and being saturated before the intensity of the desired signal is saturated. In embodiments of the present disclosure the processor 140 is configured to trigger the start of bleaching. The processor 140 may for example be configured to follow in real time the time evolution, e.g. slope, of the measured signal. Once this slope has dropped to a pre-determined value, for example 30%, or 20%, or 10%, of its initial value, the bleaching may be stopped. In that case the background may have increased to for example 70%, or 80%, or 90% of its final value.

In the following points this algorithm is illustrated by examining the dynamics which apply in a device 100 in accordance with embodiments of the present disclosure (the algorithm is not limited to embodiments and devices with these dynamics).

Assuming a first order affinity of binding reaction A+B↔AB with reaction rate constants $k_{on}$ and $k_{off}$.

The full time evolution is given by AB(t)~(1−$e^{-t/\tau}$), where $\tau$ is a constant.

So the slope as function of time is given by dAB(t)/dt~ (1/$\tau$) $e^{-t/\tau}$~$e^{-t/\tau}$ ($\tau$ is a constant, so it does not change the shape of the time dependence, only the scale factor)

Both the level (AB) and the slope change with the same time constant. The level goes from 0 to 100% of its final value, the slope goes from 100% to 0% of its initial value.

The slope of the measured signal comprises the slope of the background signal (estimated here above) and the slope of the desired signal which is for example maximum 10% of the slope of the background signal (see the last column in the table below).

Based on these equations the following table can be made:

| time t | level (AB) | slope | slope + 10% |
|---|---|---|---|
| 0 | 0% | 100% | 110% |
| 1 × $\tau$ | 63% | 37% | 47% |
| 2 × $\tau$ | 86% | 14% | 24% |
| 3 × $\tau$ | 95% | 5% | 15% |
| 4 × $\tau$ | 98% | 2% | 12% |

From this table it can be seen that if the slope of the measured signal has dropped below 24%, the level of the background is above 86%.

In alternative embodiments of the present disclosure the processor 140 is configured to trigger the start of bleaching before the desired signal is saturated (e.g. before 50% of the saturation level of the desired signal is reached or even before 30% of the saturation level is reached or even before 10% of the desired saturation level is reached).

In yet alternative embodiments of the present disclosure, the processor 140 is configured to trigger the start of bleaching after a predetermined time period has elapsed since the sample containing targets is brought into contact with the affinity probes. This predetermined period in time may be determined by calibration. In embodiments of the present disclosure this calibration may be done during product development. In embodiments of the present disclosure it may be done at the time of use. The predetermined period is dependent on the kinetics of the binding actions. For the background signal, it depends mostly on the concentration of the background molecules (e.g. large in a blood or plasma sample). A large concentration of background molecules results in a short saturation time. The predetermined period may be determined such that it is suitable for different concentrations of background molecules. This may be done either during the development of the device or during the measurement protocol. The trigger moment is a trade-off between the saturation of the background signal (which may be as fast as possible) and the build-up of the desired signal. This trigger moment is depending on the time constant of the desired signal (and thus on the luminescent targets) and on the time constant of the background signal (and thus on the background sources). In embodiments of the present disclosure, the trigger moment may be pre-selected such that the largest noise reduction is obtained. In embodiments of the present disclosure the moment in time to start bleaching may be defined experimentally (e.g. by calibration measurements).

In embodiments of the present disclosure the bleaching is stopped as soon as the measurement signal after bleaching has dropped to a percentage of the earlier measurement signal (e.g. below 40% of the earlier signal, or even below 20%, or even below 10% of the earlier measurement signal). The moment to stop bleaching may be calibrated. It is a trade-off between keeping the number of remaining luminescent targets as high as possible and decreasing the noise as much as possible. The calibration may be done such that the highest signal to noise ratio can be obtained.

In embodiments of the present disclosure the processor 140 is configured to trigger the light source 111 for exciting the remaining luminescent targets. These are the targets which are not bleached but which only enter the volume where bleaching may occur, after the bleaching has actually taken place.

In embodiments of the present disclosure the processor 140 is configured to trigger the detector 120 for detecting the luminescence signal of the remaining luminescent targets. By quantifying the remaining luminescent targets, the concentration of luminescent targets can be estimated.

The concentration of luminescent targets may be estimated:

Based on the remaining measured signal after the bleaching, thereby ignoring the small fraction of targets which is bleached (the bleaching moment can be taken early because of the slower buildup of the desired signal in comparison to the buildup of the background).

Based on calibration measurements wherein the remaining measurement signal after bleaching is calibrated as a function of concentration. The calibration results in a dose—response (remaining measurement signal) curve.

Based on the slope of the remaining measured signal. This slope changes only very little if the time constant of the desired signal is very long. The time constant of the signal itself can for example be $\tau$=100 min or more, so the slope after t=1 min=0.01×τ, or 2 min=0.02×τ or 3 min=0.03×τ, is 99%, 98%, 97%.

In embodiments of the present selective bleaching is applied. Thereby the luminescent targets are less bleached than the autofluorescent background generating molecules. The labels may for example be much more robust against bleaching than the autofluorescent background (depends e.g. on the chemical properties of the molecules, stability, nature of excited states, lifetime of excited states), or a bleaching method may be used to which the labels are less sensitive (e.g. a wavelength that is not absorbed by/does not excite the labels but does excite the background. In the last case the absorption spectra of the labels should be different from the absorption spectra of the background generating molecules.

The term processor 140 should be interpreted widely. It can be a microprocessor but it can for example also be an ASIC (application specific integrated circuit) or an FPGA (field programmable gate array), or an analog or digital signal processing device. The processing may be distributed. It may for example be partly or completely running on an external device (e.g. a smartphone). The external device, e.g. smartphone, may for example receive raw data (digitized output of the detector) or it may receive already pretreated data.

A device 100 according to embodiments of the present disclosure may be present on a printed circuit board 150. It may comprise a needle or a suction element like a cotton strip (not illustrated) and a microfluidic channel 170 for taking or receiving a fluid sample and guiding it to the surface 190. In example embodiments of the present disclosure, the different features required for executing the steps for analyzing a fluid sample may be integrated in one and the same device 100.

Depending on the embodiment, the fluidics of the device 100 can be different. They can for example be capillary and/or they can be pressure driven, e.g. pumped. Pumps can for example control the pressure or the volumetric flow rate. The microfluidic channel 170 can be an open channel or a closed channel. A schematic drawing of a device 100 in accordance with embodiments of the present disclosure and comprising the features as described above is shown in FIG. 1.

The size of the device 100, in accordance with embodiments of the present disclosure, is limited. The size may for example be comparable to the size of an SD-card or of a micro-SD card or of a USB-stick.

Embodiments of the present disclosure can for example be used to check if certain biomarkers are present in the fluid (e.g. presence of antibodies against HIV in a blood sample).

In embodiments of the present disclosure the background signal may have different origins. Luminescent sources may be present which are not linked with the analyte, hence which do not form part of target molecules. These will, nevertheless, be detected by the detector 120 and will increase the background signal of the device 100.

Figure 2:
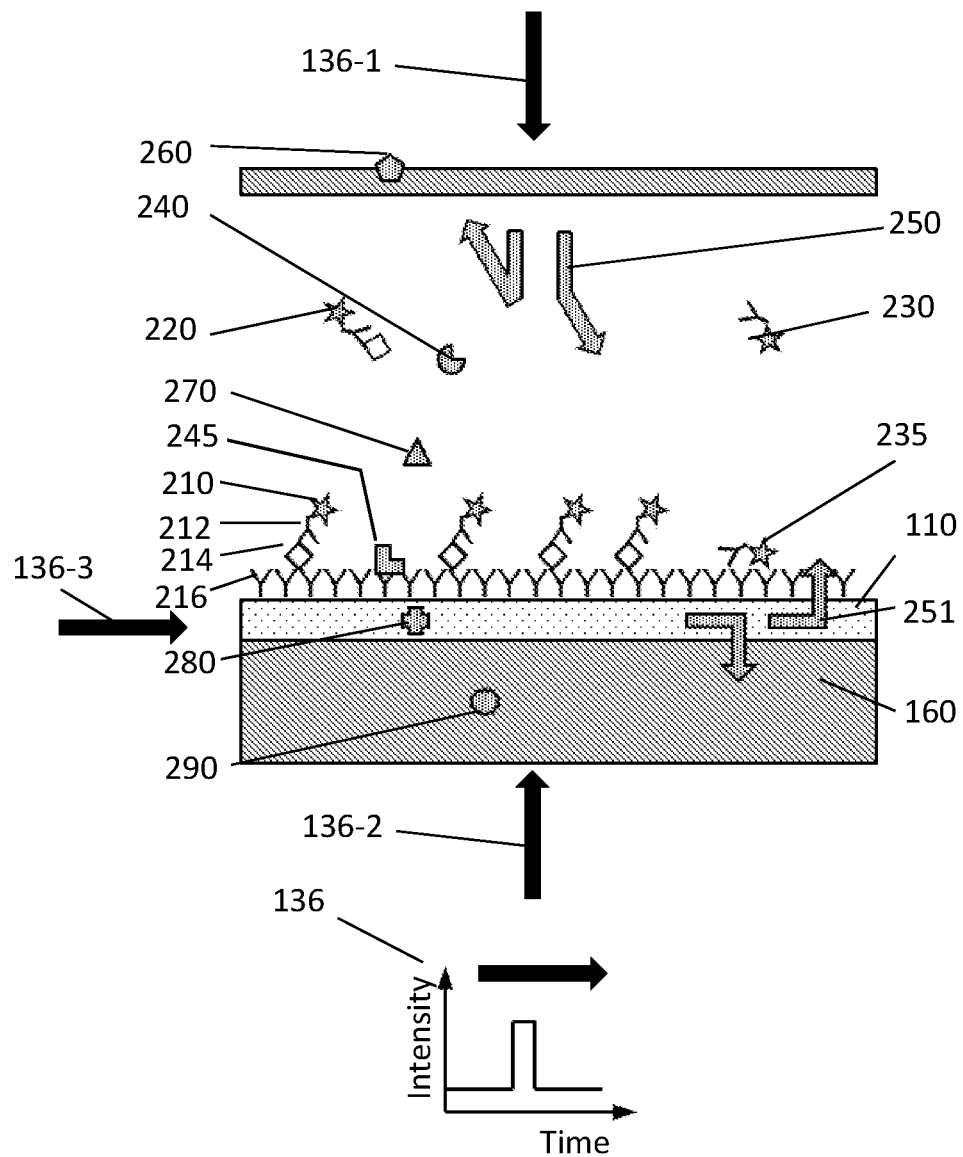
FIG. 2 is a schematic drawing illustrating the origin of desired and background signals in a device in accordance with embodiments of the present disclosure.

In an exemplary embodiment of the present disclosure, illustrated in FIG. 2, the device 100 is based on a sandwich ELISA like assay. The disclosure, however, is not limited thereto, but may for instance also be based on competitive assays and inhibition assays, where analogous sources of background are present. In a sandwich assay the target may comprise luminescent labels that are fluorescent labels or may be attached to luminescent labels that are fluorescent labels. A fluorescence signal which is coming from a target which is bound to the surface 190, whereby the target comprises fluorescent analyte, or a fluorescent label which is bound to the analyte, is part of the desired signal.

In embodiments of the present disclosure the time evolution of the intensity of the desired signal is related to the binding rate of the targets to the surface 190.

In an exemplary embodiment of the present disclosure, illustrated in FIG. 2, the device 100 is based on a sandwich ELISA like assay. The disclosure, however, is not limited thereto, but may for instance also be based on competitive assays and inhibition assays, where analogous sources of background are present. In a sandwich assay the target may comprise luminescent labels that are fluorescent labels or may be attached to luminescent labels that are fluorescent labels. A fluorescence signal which is coming from a target which is bound to the surface 190, whereby the target comprises fluorescent analyte, or a fluorescent label which is bound to the analyte, is part of the desired signal.

Instead of a surface 190, in other embodiments of the present disclosure, the targets may be bound in a 3D-matrix or gel. In that case the first affinity probes are immobilized in a 3D matrix or gel.

In the pre-incubation the labels 220 are those labels which are already connected with a target 214 but are not yet caught on the surface 190. In this figure the targets 214 have a rhombus shape, the detection probes (e.g. second antibodies) 212 have an inverse Y-shape and the capture probes (e.g. capture antibodies) 216 have a Y-shape. In such a device 100, besides other noise sources, the background signal may be coming from:

- (Auto)Fluorescent molecules 245, including labels 235 which are (non-specifically) bound to the surface 190 and which are not connected with the targets 214. These are illustrated by the L-shaped symbol in FIG. 2. These also include the labels 235 which are bound to the second antibody 212 and to the surface 190, but wherein the second antibody 212 is not bound to the target 214.
- Molecules 240 in solution. These may be (auto)fluorescent molecules 240 which have no link with a second antibody. They are illustrated by the pie-shape symbol in FIG. 2. They may for example be proteins. They mostly come from the sample, but can also come from the detection antibody mix, or the blocking agents (e.g. BSA). Molecules 240 are molecules that cannot be avoided, as they are part of the sample or a key ingredient in the assay. They may or they may not be fluorescent. When they are not fluorescent they still may scatter light and therefore increase the background signal.
- Free labels 230 in the solution which are bound to the second antibody 212 but wherein the second antibody 212 is not bound to the target 214. These labels 230 are intentionally fluorescent, and they are present in a real-time (wash-free) assay. These labels 230 are not present in an endpoint assay, after washing.
- Labels 220 in the solution which are bound to the second antibody 212 and wherein the second antibody 212 is bound to the target 214. These labels 220 are intentionally fluorescent, and they are present in a real-time (wash-free) assay. These labels 230 are not present in an endpoint assay, after washing.
- (Auto)Fluorescent centers 270 in the solution. The triangle in FIG. 2 is an illustration of such a fluorescent center. These centers are present in the buffer (the solvent) itself (i.e. the matrix wherein the (bio)molecules are present). These centers may for example be present in a buffer used in a bioreactor (when using a device 100 according to embodiments of the present disclosure in the bioreactor). In that case the buffer may be the cell culture medium which can have a complex composition and may comprise components that show luminescence (e.g. fluorescence). Often additional components are added depending on the exact nature of the cells/bacteria/yeasts/tissue that is cultured. These centers 270 will stay also when changing to buffer flow whereas the autofluorescent molecules 240 are absent in the buffer.

(Auto)Fluorescent centers 280 in the structure for generating an evanescent field 110. The cross in FIG. 2 is an illustration of such a fluorescent center.

(Auto)Fluorescent centers 290 in the substrate 160. The circle in FIG. 2 is an illustration of such a fluorescent center.

(Auto)Fluorescent centers 260 in any other part of the device 100. The pentagon in FIG. 2 is an illustration of such a fluorescent center.

Scattering 250, 251 of the excitation light. The arrows 250, 251 in FIG. 2 illustrate the scattering of the excitation light in case of free space excitation (250, e.g. illumination through a lens) and in the case of excitation using an evanescent field (251, e.g. using a waveguide). The scattering may e.g. be caused by imperfections or discontinuities in the device or the sample. Embodiments of the present disclosure comprise for example a rejection filter for filtering out the direct and/or reflected and/or scattered excitation light. However, the rejection ratio of this filter is not infinite and therefore a part of the scattered excitation light reaches the detector.

These background signals increase the noise and therefore decrease the signal to noise ratio, while it is desired to have the signal to noise ratio as large as possible.

Instead of pre-incubation, another approach would be to first send over the analyte, wash to remove any unbound particles, then send over the labelled detection probe, and wash again. In that case, some background sources are different/absent (e.g. the combination 220 would not be present, and some centers 240 would not be present in the detection probe). However, in this approach we cannot do real-time measurements, so the time-to-response is longer)

Embodiments of the present disclosure are not limited to the standardized enzyme-linked immunosorbent assay (ELISA) as illustrated in FIG. 2 or its variants, but include any affinity-based assay and can for example also be DNA based. The DNA measurements may comprise a PCR step and may involve a higher fluorophore concentration.

In the example of FIG. 2 first antibodies 216 may be linked to the surface 190 of the device 100. These antibodies 216 link with the targets 214 and through second antibodies 212 the luminescent label 210 may be linked with the analyte. The surface 190 may for example comprise between 1000 and 1 000 000 binding sites per $\mu m^2$ for example 20000 binding sites per $\mu m^2$. In embodiments of the present disclosure the number of binding events per $\mu m^2$ of surface 190 may be obtained by evaluating the following formula:

$$k_{ON}[A][B]$$

wherein [A] is the target concentration, and wherein [B] is the surface density of the free binding sites, and wherein $k_{ON}$ is the association rate constant. $k_{ON}$ is among other things defined by the reaction kinetics between the target and the capture probe and the mass transport kinetics of the target in the solution. The association rate constant may for example have an order of magnitude of $k_{ON}=10^5\ M^{-1}s^{-1}$. If the target concentration is for example [A]=1 nM then:

$$k_{ON}[A]=10^{-4}\ s^{-1}$$

meaning that each binding site has a chance of $10^{-4}\ s^{-1}$ to bind with a target.

At a low target concentration only a limited number of binding sites will be occupied. If the surface density of the binding sites (e.g. the surface 190 comprising the first antibodies) is $[B]=2\times10^4\ \mu m^2$ the number of binding events per $\mu m^2$ per second equals:

$$k_{ON}[A][B]=2\ s^{-1}\ \mu m^2$$

This rate decreases linearly with the target concentration and therefore also the desired signal decreases linearly with the target concentration.

In embodiments of the present disclosure, mainly the surface 190 of the substrate 160 or a three dimensional volume is illuminated. The evanescent field region may have a thickness of a few nm-thick or even 10 nm thick or even between 10 nm and 100 nm thick. This may be done by evanescent excitation. In these embodiments the bulk of the sample is not illuminated using free space light but using an evanescent light near the surface 190. This is also referred to as TIRF (total internal reflection fluorescence). This can be achieved by having a beam of light, coming from the evanescent field generating structure 110, incident on the interface between the evanescent field generating structure 110 and the cavity 180 at an incident angle below the critical angle, resulting in a total internal reflection. It can also be achieved by confining the light in a guiding structure such as a waveguide. TIRF can be applied in embodiments of the present disclosure. Only the luminescent labels (e.g. fluorophores) which are immobilized at the surface 190 of the substrate evanescent field generating structure 110, or which are in its immediate neighborhood (i.e., within the range of the evanescent field) will be illuminated this way. The substrate 160, on which evanescent field generating structure 110 is fabricated may be a semiconductor substrate, a glass substrate, or any other suitable type of substrate. It may be a quartz substrate. Luminescent labels which are in the bulk solution are thereby not measured. When these luminescent labels in the bulk solution are not excited they will also not generate a background signal.

Embodiments of the present disclosure comprise a waveguide for guiding the excitation light towards the evanescent excitation plane. In example embodiments of the present disclosure, the luminescent labels (e.g. fluorophores) in the bulk solution will not be excited. Only the luminescent labels which are in the evanescent field volume will be illuminated. These luminescent labels are mainly the surface immobilized luminescent labels. The labels in the bulk, which are not illuminated or which are less illuminated than the immobilized labels at the surface, will therefore generate a smaller luminescent signal than the immobilized labels at the surface. In example embodiments of the present disclosure, by only illuminating the evanescent excitation plane, the signal to noise ratio can be increased.

In embodiments of the present disclosure the bleaching device 135 is a light source adapted for generating a high intensity pulse causing bleaching of at least part of the sources generating the background signal. In embodiments of the present disclosure the high intensity pulse destroys the luminophores, e.g. fluorophores, which are present. An example of such a bleaching pulse generated by a bleaching device 135 is illustrated in FIG. 2. The pulse intensities may for example vary between 1 $W/cm^2$ and 10000 $W/cm^2$, they may for example be: 1 W/cm², 10 W/cm², 100 W/cm², 1000 W/cm², 10000 W/cm². The pulse widths may for example vary between 1 ms and 1 min, they may for example be: 1 ms, 10 ms, 100 ms, 1 s, 10 s, 1 min. A photobleaching pulse 136 may be applied from the top 136-1 or from the bottom 136-2 (in this case the substrate 160 should be transparent. A photobleaching pulse 136-3 may also be applied via the evanescent field generating structure 110.

In embodiments of the present disclosure, the intensity of the light source 111 can be varied. In example embodiments of the present disclosure, the light source can be used to excite the luminescent targets as well as to bleach the luminescent targets and at least part of the sources generating the background signal. In embodiments of the present disclosure the intensity can be varied by varying the amplitude of the exciting signal. In embodiments of the present disclosure the intensity can be varied by varying the duty cycle. The light source may for example be a bright source that is only intermittently generating a signal:

during a small fraction of the time for measuring,
during a large fraction of the time for bleaching.

In embodiments of the present disclosure, the processor 140 controls the intensity of the light source 111 by controlling the amplitude and/or the time or duty cycle of the excitation signal.

In embodiments of the present disclosure the required bleaching time is obtained by consulting datasheets of the various luminescent molecules and centers or by doing calibration measurements. The required bleaching time can for example be obtained from known properties such as photostability or chemical stability of the various luminescent molecules and centers. In embodiments of the present disclosure the background signal may be measured on a reference channel in which no luminescent targets are present.

In embodiments of the present disclosure the luminescent targets reside in a liquid. In embodiments of the present disclosure bleaching is applied by modifying the pH of the liquid. The pH of the liquid can for example be modified by mixing the liquid with another liquid, for instance a buffer fluid, having another pH value.

In embodiments of the present disclosure the luminescent targets reside in a liquid. In embodiments of the present disclosure bleaching is applied by modifying the amount of or by introducing reactive oxygen species (ROS) or other radicals or hydrogen peroxide $H_2O_2$ or other aggressive species in the liquid. The pH of the liquid can for example be modified by mixing the liquid with another liquid, for instance a buffer fluid, having another pH value.

In embodiments of the present disclosure the sources generating the background signal are the fixed luminescent centers in the transducer, the substrate, the assembly which are present from the start of the measurement. On top thereof, there are also the non-specifically bound luminescent molecules.

Figure 3:
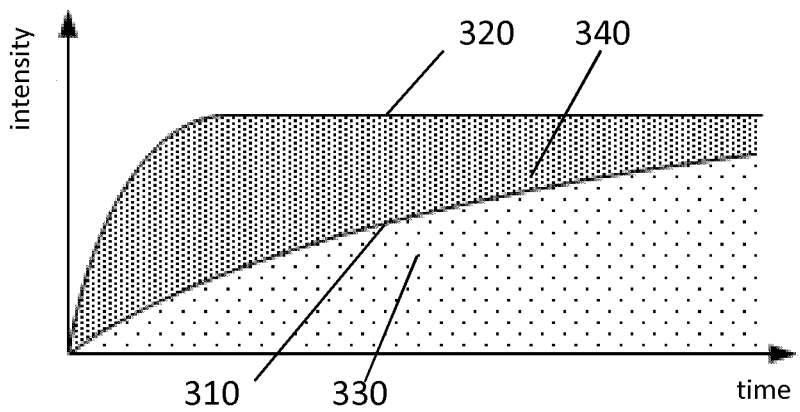
FIG. 3 shows the intensity in function of time of the desired signal and of the background signal measured in a sensor device in accordance with embodiments of the present disclosure.

The non-specifically bound fluorescent molecules may have a different time dependence compared to the specific binding. They may for example already have been saturating before the specific molecules and labels arrive (the luminescent targets) (e.g. a blocking solution that is sent over the sensor before the actual sample). Moreover the kinetic parameters such as on-rate and off-rate constants $k_{on}$ and $k_{off}$ may be different and the concentrations of the specific and the non-specific molecule may be different. In embodiments of the present disclosure the target, which is present in low concentration, will connect with the first antibodies at a slow rate and therefore the luminescence intensity caused by the labels connected to the second antibody (the desired signal) will increase more slowly than the background signal because the non-specific bound molecules are present in a much higher concentration. FIG. 3 shows the intensity in function of time of the background signal 320 and of the desired signal 310. The background signal 320 is saturating faster than the desired signal. The solid lines 310, 320 represent the total amount of immobilized molecules (only those molecules that start off as fluorescent are plotted; the non-fluorescent molecules never contribute to the signal). The shaded regions 330, 340 represent the immobilized molecules that are still fluorescent after a given time. (Without bleaching, the lines and shaded regions coincide).

Figure 4:
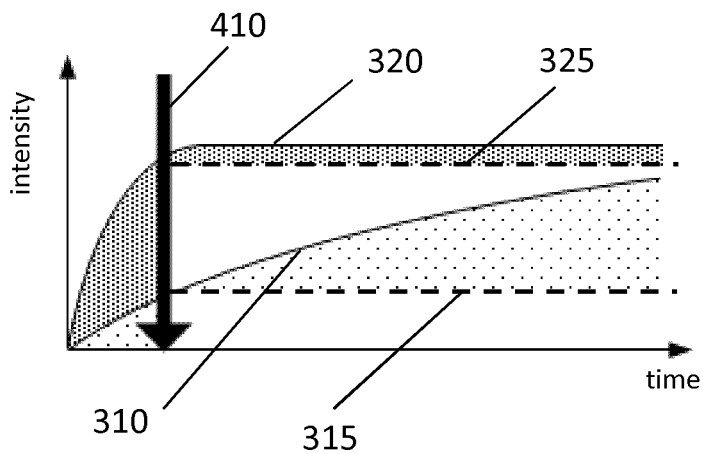
FIG. 4 shows the intensity in function of time of the desired signal and of the background signal measured in a sensor device in accordance with embodiments of the present disclosure, wherein a bleaching step is applied. After the bleaching the background signal and the desired signal each are drawn with an offset different from zero.

FIG. 4 illustrates what happens when applying a bleaching pulse 410, such as a high-intensity excitation pulse or a pH pulse or an ROS pulse, after a significant fraction of the faster background signals have built up. After the bleaching, the remaining luminescent targets (which are not bleached, e.g. because they were outside the bleaching region) will continue to connect with the first antibodies and the desired luminescence signal will continue to build up. The fixed centers in the transducer/substrate/assembly are destroyed by the bleaching and will not build up again. Also the non-specifically bound fluorescent molecules are destroyed. Thereby the background signal is decreased. The bleaching pulse, however, does not affect fluorescent centers in solution that are outside the bleaching region (e.g. not in the optical beam, or not in the pH or ROS pulse): the flow will replace bleached molecules in the bleaching region by non-bleached molecules, hence a background signal will continue to be present, albeit to a lesser extent. This way, the signal to noise ratio of a measured signal is increased.

Figure 5:
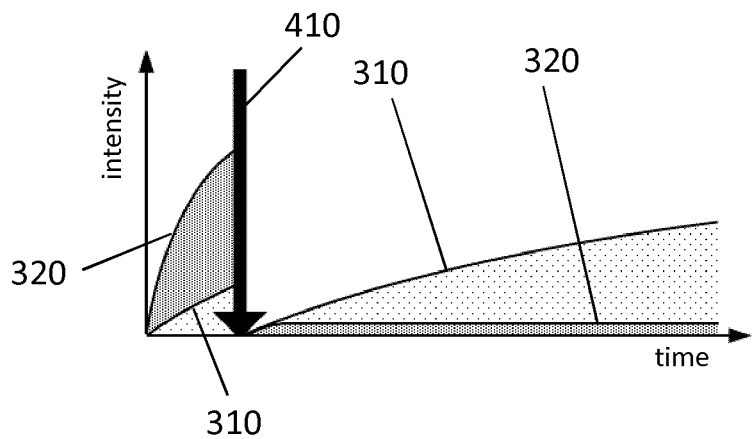
FIG. 5 shows the intensity in function of time of the desired signal and of the background signal measured in a sensor device in accordance with embodiments of the present disclosure, wherein a bleaching step is applied.

FIG. 4 shows the intensity in function of time of the background signal and of the desired signal. The total number of immobilized target and background molecules is still the same as shown in FIG. 3. However, the molecules that were present at the time of bleaching become non-fluorescent, and the fluorescent fraction consists only of the molecules that are immobilized after the bleaching event. In other words, the shaded region starts only above the level of immobilization at the bleaching time. In FIG. 4 this is represented by shifted zero-lines 315 for the desired signal 310, and 325 for the background signal 320. The same graph, but with zero-lines shifted back to the horizontal axis, is shown in FIG. 5. (The solid lines now no longer represent the total amount of immobilized molecules, but only the fluorescent fraction).

Figure 6:
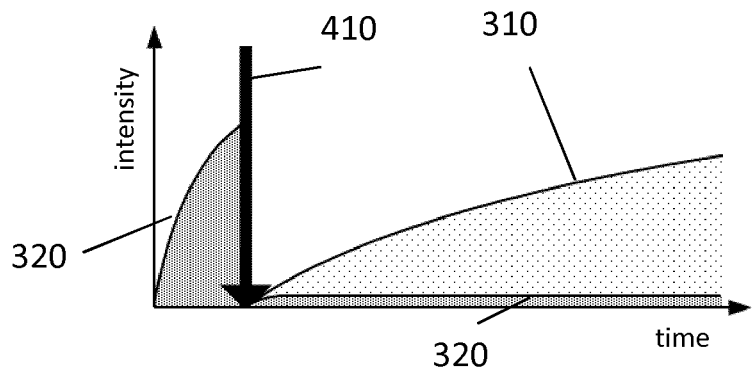
FIG. 6 shows the intensity in function of time of the desired signal and of the background signal measured in a sensor device in accordance with embodiments of the present disclosure, wherein a bleaching step is applied and wherein the targets are only added after the bleaching.

FIG. 6 shows the intensity in function of time of the background signal 320 and of the desired signal 310 when the surface 190 is first exposed to a blocking material or buffer (e.g. BSA) to start building up/to saturate the non-specific bindings, after which a bleaching step is applied, and after which the surface 190 is exposed to the sample. (FIG. 6 uses the same plotting conventions as FIG. 5).

The moment the bleaching pulse, e.g. the high intensity pulse of the pH pulse, is applied is indicated by the arrow 410. The bleaching pulse destroys the luminescent signal of both the faster and slower molecules that have already been immobilized. Since the background signal 320 was already almost saturated at the moment of the high-intensity pulse 410 compared to the desired signal 310 emanating from the luminescent targets, the desired signal 310 will build up more after the bleaching pulse than the background signal 320 does. It is to be noted, as stated above, that the bleaching step does not affect the luminescent centers in the solution that still have to pass or diffuse through the region of the sensor device 100 that is affected by the bleaching action. The flow will replace these by non-bleached molecules.

In embodiments of the present disclosure luminescent targets enter the device through diffusion and/or convection. The luminescent targets entering device after bleaching are themselves not bleached. They therefore can contribute to the desired signal. In embodiments of the present disclosure these luminescent targets are bound to the free affinity probes on the surface 190.

Figure 7:
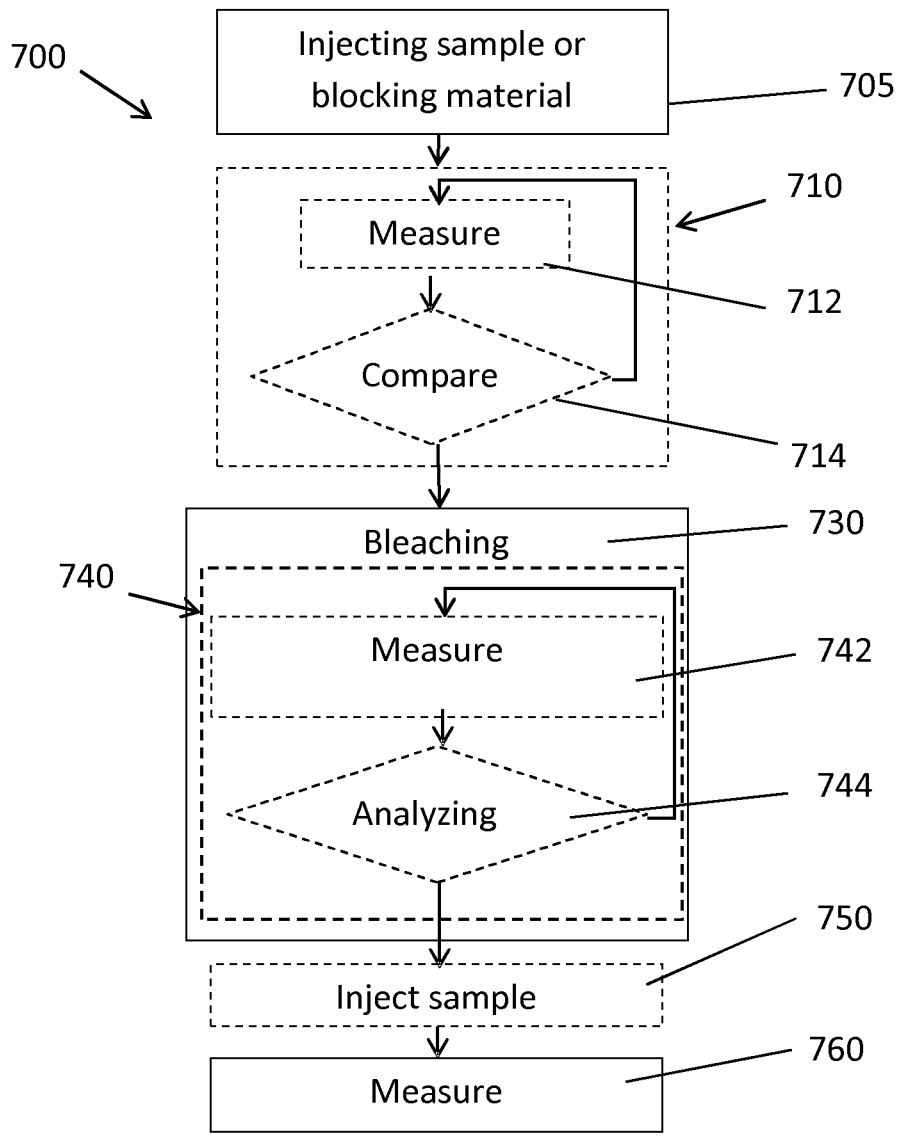
FIG. 7 shows different steps of a method for determining presence of luminescent targets in accordance with embodiments of the present disclosure.

In a second aspect, the present disclosure provides a method for determining presence of luminescent targets. FIG. 7 shows the different steps of a method 700 according to embodiments of the present disclosure.

In a first step 705 a sample or blocking material is injected in the device 100. In embodiments of the present disclosure thereby the surface 190 is exposed to the sample or to the blocking material. In embodiments of the present disclosure the surface 190 is exposed to a blocking material or buffer (e.g. BSA) to start building up/to saturate the non-specific bindings. In this case the sample is injected 750 after the bleaching step 730. The time in FIGS. 3-5 starts running when the injection of the sample starts. The time in FIG. 6 starts running when the injection of the blocking material starts. A waiting interval may be present after the first step for the bindings to complete.

In a next step optional step 710 the sample/blocking material is excited and luminescence signals are measured in the measuring step 712. These luminescence signals may be fluorescent photons which are emitted within a few ns (typically 1-5 ns) after an excitation photon has been absorbed. In this optional step 710 the measured signal is analyzed 714 to decide whether to start the bleaching. Measuring 712 and analyzing 714 is repeated until it is decided to start bleaching.

This step 710 is optional. Instead a predetermined time may be used after which the bleaching is started.

The bleaching step 730 may last during a predetermined time period. Alternatively, the bleaching step 730 may comprise an optional feedback loop 740 wherein a luminescence signal is measured (excitation and measuring) 742 and analysed 744, and wherein the intensity level after bleaching is compared with the intensity level before bleaching. When the intensity level crosses a first threshold, e.g. 40% of the intensity level before bleaching, the bleaching 730 is stopped; if not, bleaching is continued, and the signal is measured and analysed again.

The bleaching step may be followed by an optional sample injection step 750. This step is executed when in the first step 705 blocking material was injected instead of the sample. After injecting the sample a waiting interval may be applied such that for example the luminescent targets can bind to the surface 190.

In embodiments of the present disclosure the bleaching step is followed by a measurement step 760 in which the sample is excited and luminescence signals are measured. The luminescence signals may be measured once, more than once, or continuously. The luminescence measurement signal is thereby determined with an increased signal to noise ratio. Sensor devices 100 according to embodiments of the present disclosure may be used in bioreactors. Bioreactors are, for example, used in the pharmaceutical industry, in food and agriculture (e.g. beer), in cell and tissue culturing (e.g. stem cells, regenerative medicine). In those cases, (affinity-based) (bio)sensor devices, according to the present disclosure, can be used to monitor if the culture is performing fine (e.g. check nutrients, measure the concentration of a product the culture is fabricating, check for contaminations).

The invention claimed is:

1. A sensor device for determining presence of luminescent targets, wherein the sensor device comprises:
    a light source for exciting the luminescent targets, thus generating luminescence signals;
    a detector for detecting luminescence signals of the luminescent targets, resulting in a detected signal which comprises a desired signal originating from the luminescent targets and a background signal;
    a bleaching device for bleaching at least part of sources generating the background signal; and
    a processor having stored thereon program instructions that, upon execution by the processor, cause performance of a set of acts comprising:
        triggering the bleaching device to start bleaching and stop bleaching;
        triggering the light source, after bleaching, for exciting remaining luminescent targets, wherein the remaining luminescent targets are those luminescent targets that are not bleached; and
        triggering the detector for detecting the luminescence signal of the remaining luminescent targets, so as to generate a measurement signal representative for quantification of the luminescent targets.

2. The sensor device according to claim 1, wherein the bleaching device is adapted for selective bleaching, and wherein the sources generating the background signal are bleached more than the luminescent targets.

3. The sensor device according to claim 1, wherein the processor is configured to obtain a luminescent intensity using the detector during bleaching and to stop the bleaching device from bleaching when the obtained luminescent intensity has dropped below an adjustable threshold.

4. The sensor device according to claim 1, wherein the bleaching device is a light source adapted for generating a high intensity pulse causing bleaching of at least part of the sources generating the background signal.

5. The sensor device according to claim 1, wherein the luminescent targets are present in a fluid and wherein the bleaching device is adapted for applying a chemical plug which causes bleaching of at least part of the sources generating the background signal.

6. The sensor device according to claim 1, the sensor device further comprising
    a surface or a three dimensional volume for binding the luminescent targets; and
    an evanescent field generating structure,
    wherein the light source is coupled to the evanescent field generating structure, and
    wherein, the evanescent field generating structure is adapted for generating an evanescent field at the surface or in the three dimensional volume.

7. A diagnostic device comprising:
    a sensor device according to claim 2 for sensing an analyte and generating a sensing signal; and
    an output unit for providing an output of the sensor device on which a diagnosis can be based.

8. The diagnostic device according to claim 7, wherein the output unit is adapted for outputting a signal indicative of presence/absence of the analyte or a concentration of the analyte.

9. A method for quantifying luminescent targets using the sensor device of claim 1, the method comprising:

providing, at a first time, a sample comprising the luminescent targets or injecting a blocking material;

bleaching at least part of sources generating a background signal;

providing a sample comprising the luminescent targets if this was not done when injecting the first time; and measuring a luminescence signal exciting the luminescent targets which are not bleached, thus generating a luminescence signal, detecting the luminescence signal of the remaining luminescent targets which are not bleached, wherein the measured luminescence signal comprises a desired signal emanating from the luminescent targets and a background signal, so as to generate a measurement signal representative for the quantification of the luminescent targets.

10. The method according to claim 9, further comprising determining a moment in time when bleaching should start, and starting bleaching at that moment.

11. The method according to claim 10, further comprising a measure and compare step after injecting the sample or blocking material, the measure and compare step comprising exciting the sample or the blocking material, thus generating a luminescence signal, detecting the luminescence signal coming from the sample or blocking material;

analyzing the measured luminescence signal so as to obtain a moment to start bleaching; and repeating the detecting and analyzing until the moment to start bleaching is determined.

12. The method according to claim 9, comprising determining a duration of the bleaching step, and stopping bleaching after the determined duration has expired.

13. The method according to claim 9, the method further comprising a feedback loop during the bleaching step, the feedback loop comprising:

detecting a luminescence signal during bleaching;

analyzing the detected signal and comparing it with a luminescence signal obtained before bleaching started; and stopping the bleaching when the detected signal drops below a predetermined fraction of the luminescence signal obtained before bleaching started, or continuing bleaching and repeating the detection and analyzing steps if the detected signal has not dropped below the predetermined fraction of the luminescence signal obtained before bleaching started.

* * * * *